United States Patent
Huh et al.

(10) Patent No.: US 9,989,816 B2
(45) Date of Patent: Jun. 5, 2018

(54) LIQUID CRYSTAL DISPLAY DEVICE COMPRISING PIXEL ELECTRODES WITH MINUTE BRANCHES HAVING FIRST AND SECOND ANGLES

(71) Applicant: SAMSUNG DISPLAY CO., LTD., Yongin-si, Gyeonggi-do (KR)

(72) Inventors: Su Jung Huh, Yongin-si (KR); Hwa Yeul Oh, Suwon-si (KR); Ji Eun Lee, Seoul (KR)

(73) Assignee: SAMSUNG DISPLAY CO. LTD., Gyeonggi-Do (KR)

( * ) Notice: Subject to any disclaimer, the term of this patent is extended or adjusted under 35 U.S.C. 154(b) by 0 days. days.

(21) Appl. No.: 15/211,614

(22) Filed: Jul. 15, 2016

(65) Prior Publication Data
US 2017/0192314 A1 Jul. 6, 2017

(30) Foreign Application Priority Data
Jan. 6, 2016 (KR) ........................ 10-2016-0001635

(51) Int. Cl.
*G02F 1/1343* (2006.01)
*G02F 1/1335* (2006.01)
*G02F 1/1362* (2006.01)

(52) U.S. Cl.
CPC .... *G02F 1/134309* (2013.01); *G02F 1/13439* (2013.01); *G02F 1/133512* (2013.01); *G02F 1/133514* (2013.01); *G02F 1/136286* (2013.01); *G02F 2201/123* (2013.01)

(58) Field of Classification Search
CPC ................................................ G02F 2201/123
See application file for complete search history.

(56) References Cited

U.S. PATENT DOCUMENTS

| | | | | |
|---|---|---|---|---|
| 2009/0273750 A1* | 11/2009 | Liao | .................. | G02F 1/134363 349/126 |
| 2010/0157228 A1* | 6/2010 | Sakurai | ................. | G02F 1/1337 349/141 |
| 2013/0010248 A1* | 1/2013 | Kang | ................ | G02F 1/133707 349/139 |

(Continued)

FOREIGN PATENT DOCUMENTS

KR 1020070023248 A 2/2007
KR 1020070025443 A 3/2007

*Primary Examiner* — Paul Lee
(74) *Attorney, Agent, or Firm* — Cantor Colburn LLP

(57) ABSTRACT

A liquid crystal display device includes first and second substrates opposite to each other, a liquid crystal layer between the first and second substrates, a first electrode on the first substrate in a planar shape, and a second electrode on the first substrate and including pixel electrodes, which overlap the first electrode. Each of the pixel electrodes includes minute branches disposed parallel to one another, and connecting branches, which connect the minute branches, the minute branches include an edge area defined on a side thereof, and a main area defined by a remaining area, the connecting branches are disposed alternately on outer sides of the edge and main areas, and a first angle formed by the minute branches in the edge area with respect to a first direction is larger than a second angle formed by the minute branches in the main area with respect to the first direction.

20 Claims, 11 Drawing Sheets

(56) References Cited

U.S. PATENT DOCUMENTS

2014/0192308 A1\* 7/2014 Furukawa ......... G02F 1/136209
  349/138
2014/0240629 A1\* 8/2014 Zhou ................ G02F 1/134363
  349/43
2015/0001541 A1  1/2015 Shin et al.

\* cited by examiner

LIQUID CRYSTAL DISPLAY DEVICE COMPRISING PIXEL ELECTRODES WITH MINUTE BRANCHES HAVING FIRST AND SECOND ANGLES This application claims priority to Korean Patent Application No. 10-2016-0001635, filed on Jan. 6, 2016, and all the benefits accruing therefrom under 35 U.S.C. 119, the content of which in its entirety is herein incorporated by reference.

BACKGROUND

1. Field

The disclosure relates to a liquid crystal display ("LCD") device.

2. Description of the Related Art

Liquid crystal display ("LCD") devices have been widely used for various devices as a display thereof, such as notebook computers, monitors, air crafts and space crafts, for example, because of numerous desired features thereof such as low operation voltage, low power consumption, portability, and the like.

In general, an LCD device includes an array substrate, which displays an image by controlling the transmittance of liquid crystal molecules, an opposite substrate, which faces the array substrate, and a light assembly, which provides light to the array substrate and the opposite substrate. The LCD device typically includes pixels, which may render different colors, and may display arbitrary colors using combinations of the colors rendered by the pixels. The pixels may display red (R), green (G), and blue (B) colors, and various colors may be displayed using combinations of the R, G, B colors.

SUMMARY

In a liquid crystal display ("LCD"), pixel electrodes are provided in the pixels, respectively, and the display quality of the LCD device may depend on the structure of the pixel electrodes. Accordingly, a pixel electrode structure capable of improving the display quality of the LCD device is desired.

Exemplary embodiments of the disclosure provide an LCD device having a pixel electrode structure capable of improving display quality.

According to an exemplary embodiment of the disclosure, an LCD device includes a first substrate, a second substrate disposed opposite to the first substrate, a liquid crystal layer interposed between the first and second substrates, a first electrode disposed on the first substrate and having a planar shape, and a second electrode disposed on the first substrate and including a plurality of pixel electrodes, which overlap the first electrode. In such an embodiment, each of the pixel electrodes includes a plurality of minute branches disposed in parallel to one another, and connecting branches, which connect the minute branches. In such an embodiment, the minute branches are divided into an edge area defined on a side thereof, and a main area defined by a remaining area thereof, the connecting branches are disposed alternately on an outer side of the edge area and an outer side of the main area, and a first angle formed by the minute branches in the edge area with respect to a first direction is larger than a second angle formed by the minute branches in the main area with respect to the first direction.

According to another exemplary embodiment of the disclosure, An LCD device includes, a first substrate, a second substrate disposed opposite to the first substrate, a liquid crystal layer interposed between the first and second substrates, a first electrode disposed on the first substrate and having a planar shape, and a second electrode disposed on the first substrate and including a plurality of pixel electrodes, which overlap the first electrode. In such an embodiment, each of the pixel electrodes is divided into first and second domain areas, which are symmetrical with respect to an imaginary line extending in a first direction. In such an embodiment, each of the pixel electrodes includes a plurality of first minute branches, which are in the first domain and disposed in parallel to one another, first connecting branches, which are in the first domain and connect the first minute branches, a plurality of second minute branches, which are in the second domain and disposed in parallel to one another, and second connecting branches, which in the second domain and connect the second minute branches. In such an embodiment, each of the first minute branches and the second minute branches are divided into an edge area defined on a side thereof, and a main area defined by a remaining area thereof, and the first connecting branches are disposed alternately on an outer side of the edge area of the first domain area and an outer side of the main area of the first domain area, the second connecting branches are disposed alternately on an outer side of the edge area of the second domain area and an outer side of the main area of the second domain area. In such an embodiment, a first angle formed by the first minute branches in the edge area of the first domain area with respect to the first direction is larger than a second angle formed by the first minute branches in the main area of the first domain area with respect to the first direction, a third angle formed by the second minute branches in the edge area of the second domain with respect to the first direction is symmetrical with the first angle with respect to the first direction, and a fourth angle formed by the second minute branches in the main area of the second domain with respect to the first direction is symmetrical with the second angle with respect to the first direction.

According to exemplary embodiments, an LCD device has a pixel electrode structure capable of improving display quality.

BRIEF DESCRIPTION OF THE DRAWINGS

The above and other features of the disclosure will become more apparent by describing in detail exemplary embodiments thereof with reference to the attached drawings, in which.

DETAILED DESCRIPTION

Figure 1:
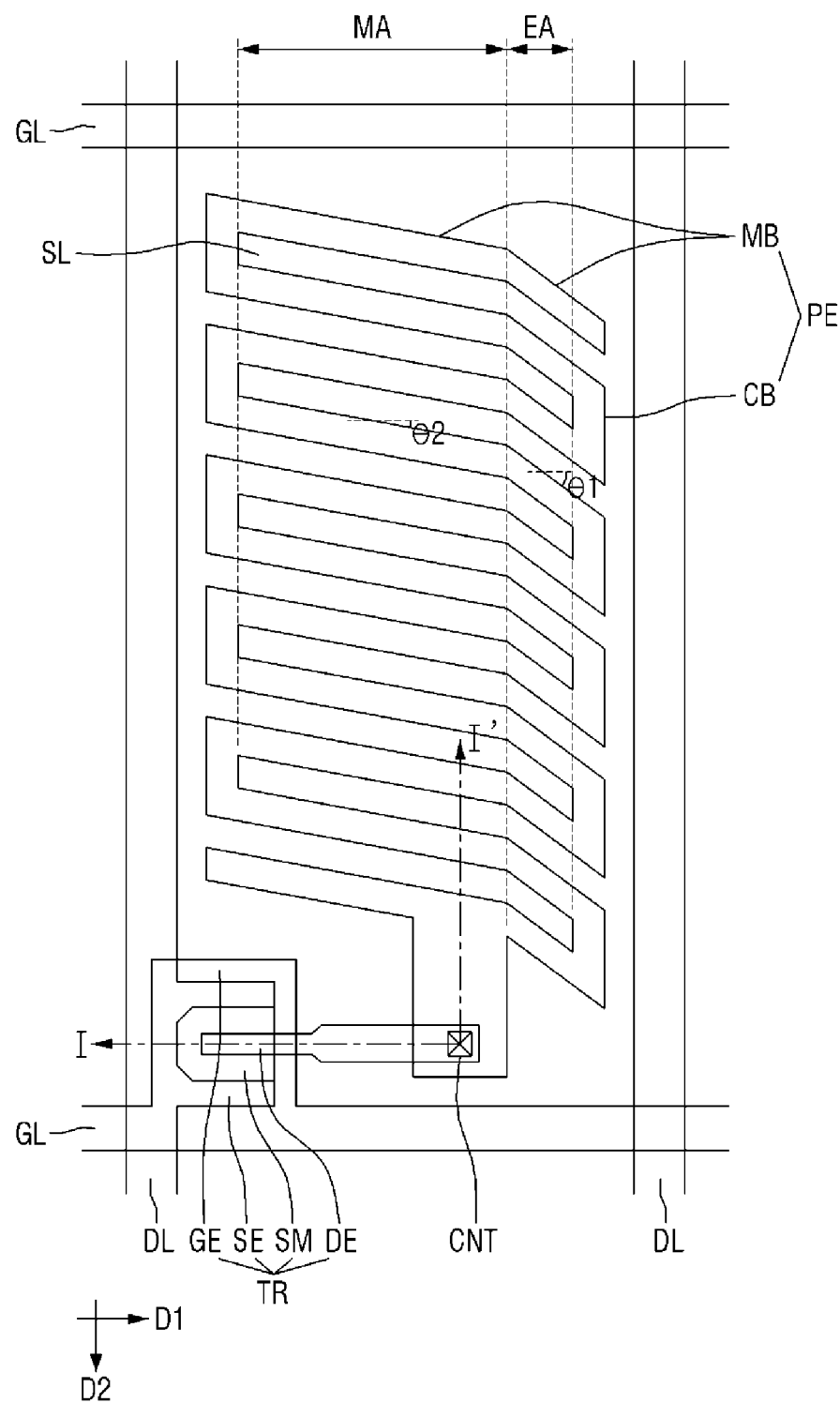
FIG. 1 is a plan view of a pixel of a liquid crystal display ("LCD") device according to an exemplary embodiment of the disclosure.

The invention will now be described more fully hereinafter with reference to the accompanying drawings, in which preferred embodiments of the invention are shown. This invention may, however, be embodied in different forms and should not be construed as limited to the embodiments set forth herein. Rather, these embodiments are provided so that this disclosure will be thorough and complete, and will fully convey the scope of the invention to those skilled in the art. The same reference numbers indicate the same components throughout the specification. In the attached figures, the thickness of layers and regions is exaggerated for clarity.

It will be understood that, although the terms first, second, third, etc., may be used herein to describe various elements, these elements should not be limited by these terms. These terms are only used to distinguish one element from another element. Thus, a first element discussed below could be termed a second element without departing from the teachings of the invention.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Hereinafter, exemplary embodiments of the invention will be described in detail with reference to the accompanying drawings.

Figure 2:
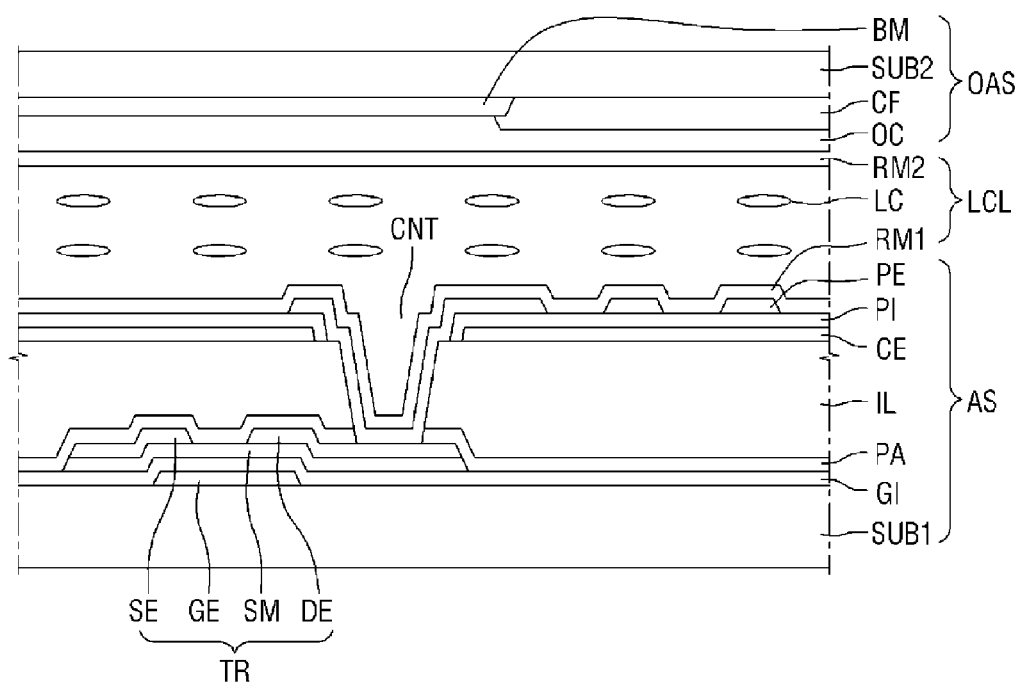
FIG. 2 is a cross-sectional view taken along line I-I' of FIG. 1.

FIG. 1 is a plan view of a pixel of a liquid crystal display ("LCD") device according to an exemplary embodiment of the disclosure, and FIG. 2 is a cross-sectional view taken along line I-I' of FIG. 1.

Referring to FIGS. 1 and 2, an exemplary embodiment of the LCD device includes an array substrate AS, an opposite substrate OAS, and a liquid crystal layer LCL.

The array substrate AS is a thin-film transistor ("TFT") array substrate, on which TFTs TR for driving liquid crystal molecules LC in the liquid crystal layer LCL are disposed, and the opposite substrate OAS may be a substrate facing the array substrate AS.

The array substrate AS will hereinafter be described in greater detail.

In an exemplary embodiment, as shown in FIG. 2, the array substrate AS includes a first base substrate SUB1. The first substrate SUB1 may be a transparent insulating substrate. In one exemplary embodiment, for example, the first base substrate SUB1 may be a glass substrate, a quartz substrate, or a transparent resin substrate. The first base substrate SUB1 may include a polymer or plastic material with high thermal resistance. The first base substrate SUB1 may be in the shape of a flat plate, but not being limited thereto. Alternatively, the first base substrate SUB1 may be curved in a particular direction. The first base substrate SUB1 may be in a rectangular shape with four sides in a plan view, but not being limited thereto. Alternatively, the first base substrate SUB1 may be in a polygonal or circular shape or may have some curved sides.

In an exemplary embodiment, the first base substrate SUB1 may be a flexible substrate. In such an embodiment, the first base substrate SUB1 may be deformable through rolling, folding or bending.

A gate line GL and a gate electrode GE are disposed on the first base substrate SUB1.

The gate electrode GE may include an aluminum (Al)-based metal such as Al or an Al alloy, a silver (Ag)-based metal such as Ag or an Ag alloy, a copper (Cu)-based metal such as Cu or a Cu alloy, a molybdenum (Mo)-based metal such as Mo or a Mo alloy, chromium (Cr), tantalum (Ta), or titanium (Ti). Each of the gate line GL and the gate electrode GE may have a single-layer structure or may have a multi-layer structure including two conductive films having different physical properties from each other. In an exemplary embodiment where each of the gate line GL and the gate electrode GE has a multilayer structure including two conductive films, one of the two conductive films may include or be formed of a low-resistance metal, for example, an Al-based metal, an Ag-based metal, or a Cu-based metal, to reduce signal delays or voltage drops in the gate line GL and the gate electrode GE, and the other of the two conductive films may include or be formed of a material with high contact properties with respect to indium tin oxide ("ITO") and indium zinc oxide ("IZO"), such as a Mo-based metal, Cr, Ti, or Ta. In one exemplary embodiment, for example, the multilayer structure of each of the gate line GL and the gate electrode GE include the combination of a Cr lower film and an Al upper film and the combination of an Al lower film and a Mo upper film, but the disclosure is not limited thereto.

Alternatively, the gate line GL and the gate electrode GE may be formed using various metals and conductors other than those set forth herein.

The gate line GL may transmit a gate signal and may extend in a first direction D1. The gate electrode GE may protrude from the gate line GL.

The first direction D1 may correspond to a direction from the left to the right on a plane where the first base substrate SUB1 is disposed, but the disclosure is not limited thereto. That is, the first direction D1 may be a direction indicated by a straight line extending in an arbitrary direction on the plane where the first base substrate SUB1 is disposed.

A gate insulating layer GI is disposed on the gate line GL and the gate electrode GE. The gate insulating layer GI may include or be formed of an insulating material. In one exemplary embodiment, for example, the gate insulating layer GI may include or be formed of silicon nitride, silicon oxide, silicon oxynitride, or a high dielectric constant material. The gate insulating layer GI may have a single-layer structure or may have a multilayer structure including two insulating films having different physical properties from each other.

A semiconductor layer SM is disposed on the gate insulating layer GI. The semiconductor layer SM may be disposed to at least partially overlap the gate electrode GE. The semiconductor layer SM may include amorphous silicon, polycrystalline silicon, or an oxide semiconductor.

Although not specifically illustrated, an ohmic contact member may be further disposed on the semiconductor layer SM. The ohmic contact member may include or be formed of n+ hydrogenated amorphous silicon doped with a high concentration of n-type impurities, or silicide. The ohmic contact member may be disposed on the semiconductor layer SM, being paired with another ohmic contact member. In an exemplary embodiment, where the semiconductor layer SM includes or is formed of an oxide semiconductor, the ohmic contact member may not be provided.

A data line DL, a source electrode SE and a drain electrode are disposed on the semiconductor layer SM and the gate insulating layer GI.

The data line DL may transmit a data signal and may extend in a second direction D2 to intersect the gate line GL.

The second direction D2 may be a direction indicated by an arbitrary straight line extending at a predetermined angle with respect to an arbitrary line extending in the first direction D1. That is, the second direction D2 may be a direction indicated by an arbitrary straight line extending not in parallel to the arbitrary straight line extending in the first direction D1. In the description that follows, it is assumed that the second direction D2 is a direction indicated by an arbitrary straight line intersecting the arbitrary straight line extending in the first direction D1, i.e., a direction indicated by an arbitrary straight line extending from the top to the bottom on the plane where the first base substrate SUB1 is disposed, as illustrated in FIG. 1.

The source electrode SE may be branched off, and protrude, from the data line DL, and the drain electrode DE may be spaced from the source electrode SE. The source electrode SE and the drain electrode DE may partially overlap or contact the semiconductor layer SM, or may face each other with the semiconductor layer SM disposed therebetween. At least one of the source electrode SE and the drain electrode DE may be disposed to at least partially overlap the gate electrode GE, but the disclosure is not limited thereto.

The data line DL, the source electrode SE and the drain electrode DE may include or be formed of Al, Cu, Ag, Mo, Cr, Ti, Ta or an alloy thereof. Each of the data line DL, the source electrode SE and the drain electrode DE may have a multilayer structure including a lower film including or formed of a refractory metal and a low-resistance upper film including or formed on the lower film, but the disclosure is not limited thereto.

The gate electrode GE, the source electrode SE and the drain electrode DE may collectively define a TFT TR together with the semiconductor layer SM, and the channel of the TFT TR may be formed in the semiconductor layer SM between the source electrode SE and the drain electrode DE. The TFT TR may be electrically connected to the gate line GL and the data line DL.

A passivation layer PA is disposed on the gate insulating layer GI and the TFT TR. The passivation layer PA may include or be formed of an inorganic insulating material and may cover the TFT TR.

A protective layer IL is disposed on the passivation layer PA. The protective layer IL may planarize the top of the passivation layer PA. The protective layer IL may include or be formed of an organic material. In one exemplary embodiment, for example, the protective layer IL may include or be formed of a photosensitive organic composition.

A contact hole CNT, which exposes part of the TFT TR, particularly, part of the drain electrode DE, is defined or formed through the protective layer IL and the passivation layer PA.

A common electrode CE is disposed on the protective layer IL. The common electrode CE may be disposed, in a planar shape, on the entire protective layer IL except for an area, in which the contact hole CNT is defined, and the surroundings of the area in which the contact hole CNT is defined. The common electrode CE may include or be formed of a transparent conductive material such as ITO, IZO, indium tin zinc oxide ("ITZO"), or aluminum-doped zinc oxide ("AZO").

The common electrode CE may be provided with a common voltage and may thus generate an electric field together with a pixel electrode PE, which will be described later in detail.

A pixel insulating layer PI is disposed on the common electrode CE. The pixel insulating layer PI may include or be formed of an inorganic insulating material. The pixel insulating layer PI may insulate the common electrode CE, which is disposed below the pixel insulating layer PI, and the pixel electrode PE, which is disposed on the pixel insulating layer PI, from each other. Accordingly, an electric field may be formed between the common electrode CE and the pixel electrode PE.

The pixel electrode PE is disposed on the pixel insulating layer PI. Part of the pixel electrode PE may be physically connected to the drain electrode DE via the contact hole CNT and may thus receive a voltage from the drain electrode DE. The pixel electrode PE may include or be formed of a transparent conductive material such as ITO, IZO, ITZO, or AZO.

The pixel electrode PE may include a plurality of minute branches MB and a plurality of connecting branches CB. The minute branches MB extend substantially in the first direction D1 or in a similar direction to the first direction D1. The similar direction to the first direction D1 may be a direction having a crossing angle of less than ±45° with the first direction D1.

The minute branches MB may be spaced from one another by a predetermined distance and may be disposed in parallel to one another. Slits SL in which no transparent conductive material is provided are defined between the minute branches MB. Accordingly, the minute branches MB, the slits SL, and the common electrode CE, which are disposed below the minute branches MB and the slits SL, may interact with one another to generate an electric field, and liquid crystal molecules LC may be controlled by the electric field.

The connecting branches CB may extend substantially in the second direction D2 and may electrically and physically connect the minute branches MB to one another. Accordingly, when a voltage is provided to one of the minute branches MB and the connecting branches CB, the voltage may be transmitted to all the minute branches MB and all the connecting branches CB.

In an exemplary embodiment, as shown in FIG. 1, the minute branches MB may be disposed in an edge area EA and a main area MA. The edge area EA and the main area MA are divided by an imaginary line extending, along the second direction D2, across the area in which the minute branches MB are disposed, and the width of the edge area EA in the first direction D1 may be smaller than the width of the main area MA in the first direction D1. In an exemplary embodiment, a first angle $\theta 1$ formed by the minute branches MB with the first direction D1 in the edge area EA may be larger than a second angle $\theta 2$ formed by the minute branches MB with the first direction D1 in the main area MA.

In such an embodiment, where the first angle $\theta 1$ may be larger than the second angle $\theta 2$, the control over the liquid crystal molecules LC on an outer side of the edge area EA may be further improved. Accordingly, the misalignment of the liquid crystal molecules LC in the edge area EA may be effectively prevented, and the response speed of the LCD device may be improved. However, since the transmittance of the edge area EA may be lower than the transmittance of the main area MA, the edge area EA may be disposed on one side, rather than both sides, of the main area MA, thereby minimizing a decrease in transmittance.

The connecting branches CB may be disposed alternately on the outer side of the edge area EA and an outer side of the main area MA and may thus connect the minute branches MB. In an exemplary embodiment, as illustrated in FIG. 1, the pixel electrode PE may be zigzag-shaped or W-shaped as a whole due to the connecting branches CB being disposed alternately on the outer side of the edge area EA and the outer side of the main area MA.

In an exemplary embodiment having such an arrangement of the connecting branches CB, the transmittance and the uniformity of the LCD device may be improved. If the connecting branches CB are formed on both the outer side of the edge area EA and the outer side of the main area MA as bars having a similar length to the long axis of the pixel electrode PE, the control over the liquid crystal molecules LC on outer sides of the connecting branches CB may weaken, and thus, the transmittance of the LCD device may decrease. If the connecting branches CB on the outer side of the edge area EA are removed or the connecting branches CB on the outer side of the main area MA are removed, the control over the liquid crystal molecules LC may become non-uniform or imbalanced between both sides of the LCD device, and thus, the uniformity of the LCD device may decrease. In an exemplary embodiment, where the pixel electrode PE is zigzag-shaped or W-shaped as a whole, as illustrated in FIG. 1, the pixel electrode PE's control over the liquid crystal molecules LC may be uniformly maintained while improving the transmittance of the LCD device.

In an exemplary embodiment, the restoration force of the liquid crystal molecules LC may be improved, compared to a case in which the connecting branches CB are continuously disposed on only one side of the edge area EA to form a bar having a similar length to the long axis of the pixel electrode PE. More specifically, even if the liquid crystal molecules LC are irregularly aligned or misaligned in an unintended direction in response to a physical shock being applied to the LCD device, the liquid crystal molecules LC may be realigned in an intended direction by an electric field formed in each pixel. However, if the liquid crystal molecules LC take time to be realigned in the intended direction due to their weak restoration force, such an undesirable slow realignment may be recognized by a user.

If the connecting branches CB are continuously disposed on the outer side of the edge area EA or the outer side of the main area MA, the restoration force of the liquid crystal molecules LC may be weak even if the minute branches MB are disposed across the main area MA and the edge area EA. In this case, the liquid crystal molecules LC may not be able to be realigned within 1000 milliseconds (msec), and as a result, an afterimage may be viewed undesirably by the user.

In an exemplary embodiment, where the minute branches MB are disposed across the main area MA and the edge area EA and at the same time, the connecting branches CB are disposed alternately on the outer side of the edge area EA and the outer side of the main area MA, such that the restoration force of the liquid crystal molecules LC may be relatively strengthened, and may thus be able to be realigned within about 600 msec. Accordingly, a phenomenon in which an afterimage caused by the misalignment of the liquid crystal molecules LC is viewed by the user may be substantially minimized.

The width of the edge area EA in the first direction D1 may be in a range of about 2 micrometers ($\mu$m) to about 5 $\mu$m. In such an embodiment, where the width of the edge area EA in the first direction D1 is in a range of about 2 $\mu$m to about 5 $\mu$m, an actual improvement in the control over the liquid crystal molecules LC may be obtained.

The opposite substrate OAS will hereinafter be described in detail.

In an exemplary embodiment, as shown in FIG. 2, the opposite substrate OAS includes a second base substrate SUB2, a light-shielding member BM, and an overcoat layer OC.

The opposite substrate OAS includes the second base substrate SUB2. The second base substrate SUB2 may be a transparent insulating substrate. In one exemplary embodiment, for example, the second base substrate SUB2 may be a glass substrate, a quartz substrate or a transparent resin substrate. The second base substrate SUB2 may include a polymer or plastic material with high thermal resistance. The second base substrate SUB2 may be in the shape of a flat plate, but not being limited thereto. Alternatively, the second base substrate SUB2 may be curved in a particular direction.

In an exemplary embodiment, the second base substrate SUB2 may have flexibility. In such an embodiment, the second base substrate SUB2 may be a substrate that is deformable through rolling, folding or bending.

The light-shielding member BM is disposed on the second base substrate SUB2 (e.g., on a lower surface of the second base substrate SUB2 as shown in FIG. 2). The light-shielding member BM may be disposed to overlap the TFT TR of each pixel, the data line DL and the gate line GL, and may thus effectively prevent light leakage that may be caused by the misalignment of the liquid crystal molecules LC.

A color filter CF is disposed on the second base substrate SUB2 and the light-shielding member BM. The color filter CF may allow the transmission of particular wavelength band components of light incident thereupon from the outside of the first base substrate SUB1 while blocking the transmission of other wavelength band components, and may thus allow light emitted to the outside of the second base substrate SUB2 to be tinged with a particular color.

In one exemplary embodiment, for example, a red color filter RCF, which is a type of the color filter CF that makes a red color visible, transmits light in a wavelength band of about 580 nm to about 780 nm therethrough and absorbs (and/or reflects) light in the other wavelength bands, a green color filter GCF, which is another type of the color filter CF that makes a green color visible, transmits light in a wavelength band of about 450 nm to about 650 nm therethrough and absorbs light in the other wavelength bands, and a blue color filter BCF, which is another type of the color filter CF that makes a blue color visible, transmits light in a wavelength band of about 380 nm to about 560 nm therethrough and absorbs light in the other wavelength bands. In an exemplary embodiment, the red color filter RCF may include or be formed of a pigment or a photosensitive organic material rendering a red color, the green color filter GCF may include or be formed of a pigment or a photosensitive organic material rendering a green color, and the blue color filter BCF may include or be formed of a pigment or a photosensitive organic material rendering a blue color.

The overcoat layer OC is disposed on the light-shielding member BM and the color filter CF. The overcoat layer OC planarizes or reduces any height difference between surfaces of the light-shielding member BM and the color filter CF. Alternatively, the overcoat layer OC may not be provided.

The liquid crystal layer LCL will hereinafter be described.

The liquid crystal layer LCL includes a plurality of liquid crystal molecules LC having dielectric anisotropy. The liquid crystal molecules LC may be horizontal alignment-type liquid crystal molecules LC arranged between the array substrate AS and the opposite substrate OAS in a horizontal direction with respect to the array substrate AS and the opposite substrate OAS. In response to an electric field being applied between the array substrate AS and the opposite substrate OAS, the liquid crystal molecules LC may rotate in a particular direction between the array substrate AS and the opposite substrate OAS and may thus either block or allow the transmission of light.

Reactive mesogen layers (RM1 and RM2) may be additionally provided to pretilt the liquid crystal molecules LC of the liquid crystal layer LCL. The reactive mesogen layers (RM1 and RM2) may include a first reactive mesogen layer RM1, which is disposed between the pixel electrode PE and the liquid crystal layer LCL, and a second reactive mesogen layer RM2, which is disposed between the overcoat layer OC and the liquid crystal layer LCL.

Figure 3:
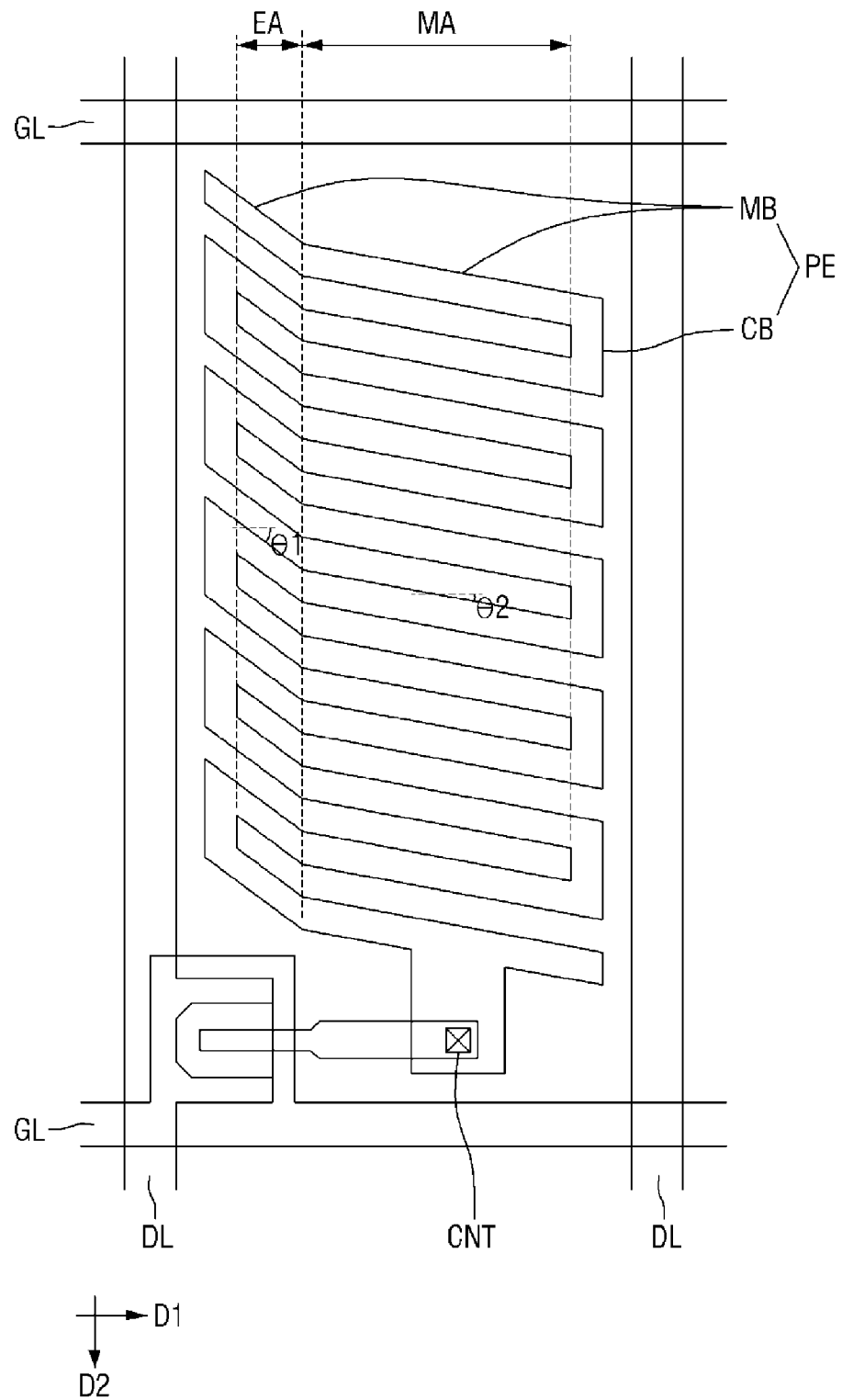
FIG. 3 is a plan view of a pixel of an LCD device according to an alternative exemplary embodiment of the disclosure.

FIG. 3 is a plan view of a pixel of an LCD device according to an alternative exemplary embodiment of the disclosure.

The LCD device shown in FIG. 3 is substantially the same as the LCD device shown in FIG. 1 expect for the pixel electrode PE. The same or like elements shown in FIG. 3 have been labeled with the same reference characters as used above to describe the exemplary embodiments of the LCD device shown in FIG. 1, and any repetitive detailed descriptions thereof will hereinafter be omitted or simplified.

In an exemplary embodiment, as show in FIG. 1, the edge area EA is disposed on a first side (e.g., the right side) of the main area MA in the first direction D1. In an alternative exemplary embodiment, referring to FIG. 3, an edge area EA may be disposed on a second side of a main area MA in a first direction D1 (e.g., the left side of the main area MA).

In such an embodiment, the edge area EA of a pixel electrode PE, which is included in each pixel, may be provided on the first side or the second side of the main area in the first direction D1.

Figure 4:
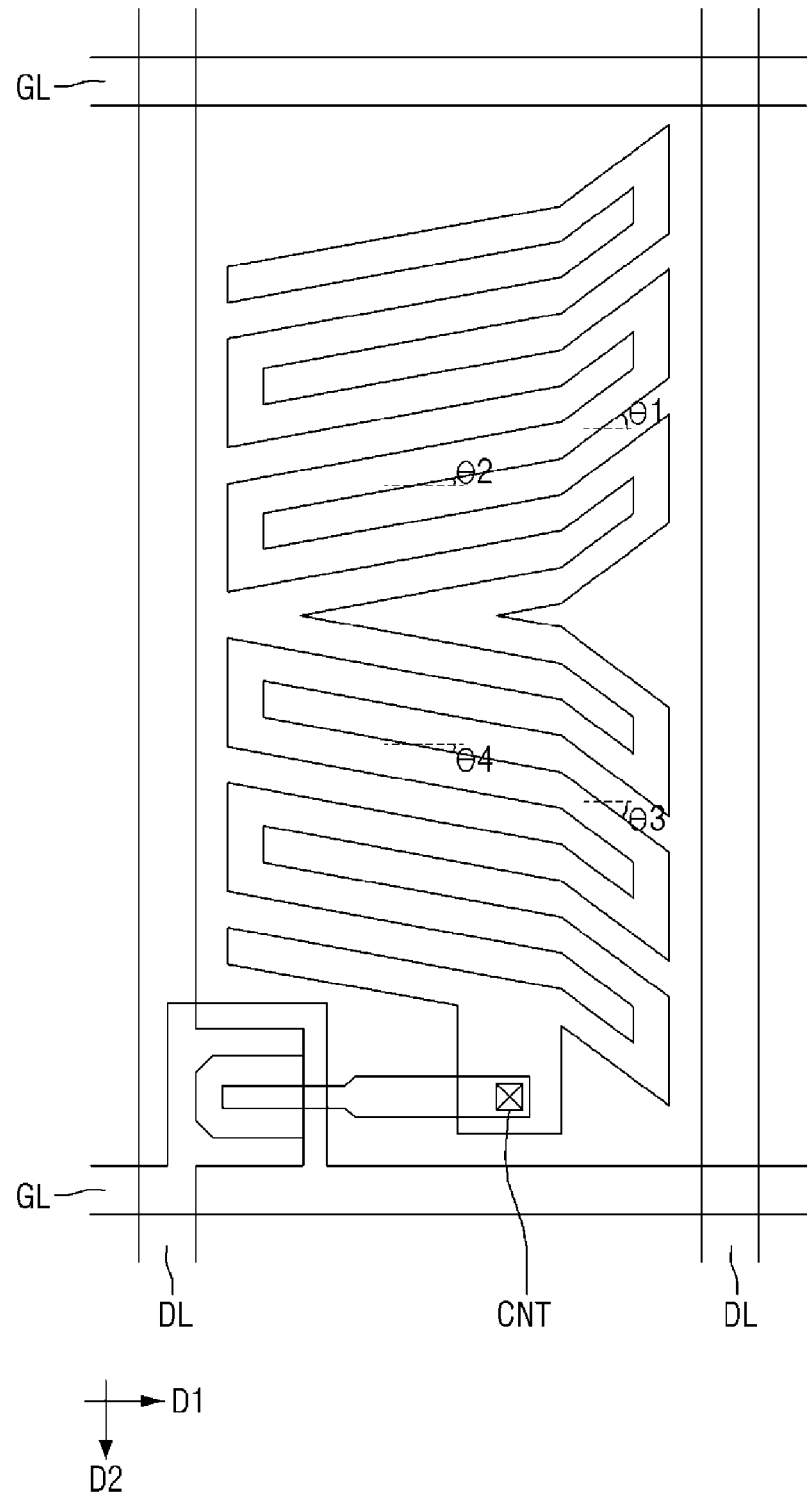
FIG. 4 is a plan view of a pixel of an LCD device according to another alternative exemplary embodiment of the disclosure.
Figure 5:
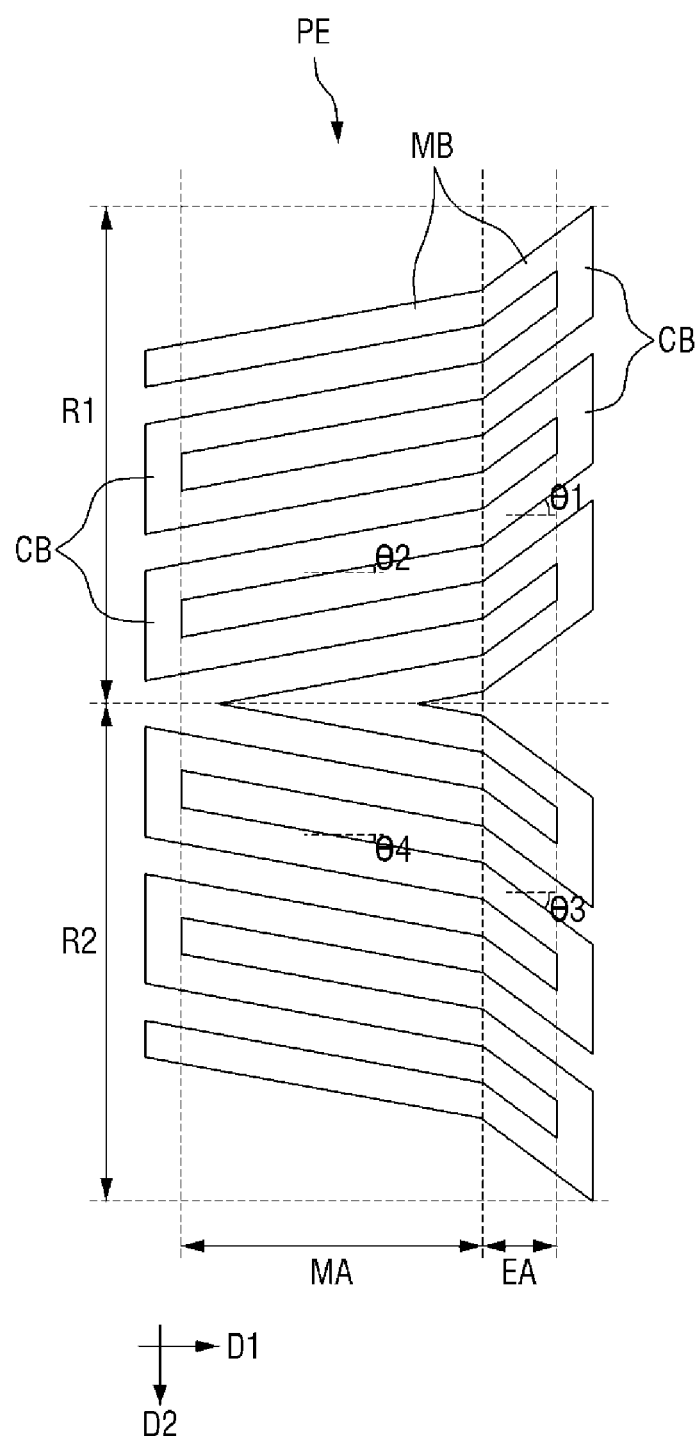
FIG. 5 is a plan view of a pixel electrode of FIG. 4.

FIG. 4 is a plan view of a pixel of an LCD device according to another alternative exemplary embodiment of the disclosure, and FIG. 5 is a plan view of a pixel electrode of FIG. 4.

Referring to FIGS. 4 and 5, in an exemplary embodiment, some of a plurality of minute branches MB form a first angle $\theta 1$ with a first direction D1 in an edge area EA, and the other minute branches MB form a third angle $\theta 3$ with the first direction D1 in the edge area EA. In such an embodiment, some of the minute branches MB form a second angle $\theta 2$ with the first direction D1 in a main area MB, and the other minute branches MB form a fourth angle $\theta 4$ with the first direction D1 in the main area MB. The first angle $\theta 1$ may be larger than the second angle $\theta 2$, and the third angle $\theta 3$ may be larger than the fourth angle $\theta 4$.

In an exemplary embodiment, the first angle $\theta 1$ and the third angle $\theta 3$ may be equal to each other, and the second angle $\theta 2$ and the fourth angle $\theta 4$ may be equal to each other. The minute branches MB and a plurality of connecting branches CB may be arranged symmetrically with respect to an imaginary center line extending in the first direction D1 at a center portion of the pixel electrode, and the area in which the minute branches MB form the first angle $\theta 1$ or the second angle $\theta 2$ with the first direction D1 may be defined as a first domain area R1 and the area in which the minute branches MB form the third angle $\theta 3$ or the fourth angle $\theta 4$ with the first direction D1 may be defined as a second domain area R2. The minute branches MB and the connecting branches CB, which are disposed in and across the first domain area R1 and the second domain area R2, may be symmetrical with respect to a boundary between the first domain area R1 and the second domain area R2, overlapping the imaginary center line extending in the first direction D1. In an exemplary embodiment, where the minute branches MB, which are provided in the main area MA and the edge area EA, are disposed in and across a plurality of domain areas, the horizontal and vertical visibility of an LCD device may become further uniform.

In an exemplary embodiment, as illustrated in FIGS. 4 and 5, the minute branches MB and the connecting branches CB in the first domain area R1 and the minute branches MB and the connecting branches CB in the second domain area R2 may be symmetrical with respect to the imaginary central straight line extending in the first direction D1, but not being limited thereto. Alternatively, the first and second domain areas R1 and R2 may be distinguished from each other not by a reference line, with respect to which the first and second domain areas R1 and R2 are symmetrical with each other, but by an imaginary line in a direction in which the minute branches MB extend. In such an embodiment, the numbers of minute branches MB and connecting branches CB may differ from the first domain area R1 to the second domain area R2, and the pixel electrode PE, which is disposed across the first and second domain areas R1 and R2, may not be symmetrical with respect to the imaginary center line extending in the first direction D1. In such an embodiment, the minute branches MB in the first domain area R1 may all extend in the same direction as each other, the minute branches MB in the second domain area R2 may all extend in the same direction as each other, and the minute branches MB in the first domain area R1 may extend in a different direction from the minute branches MB in the second domain area R2.

Figure 6:
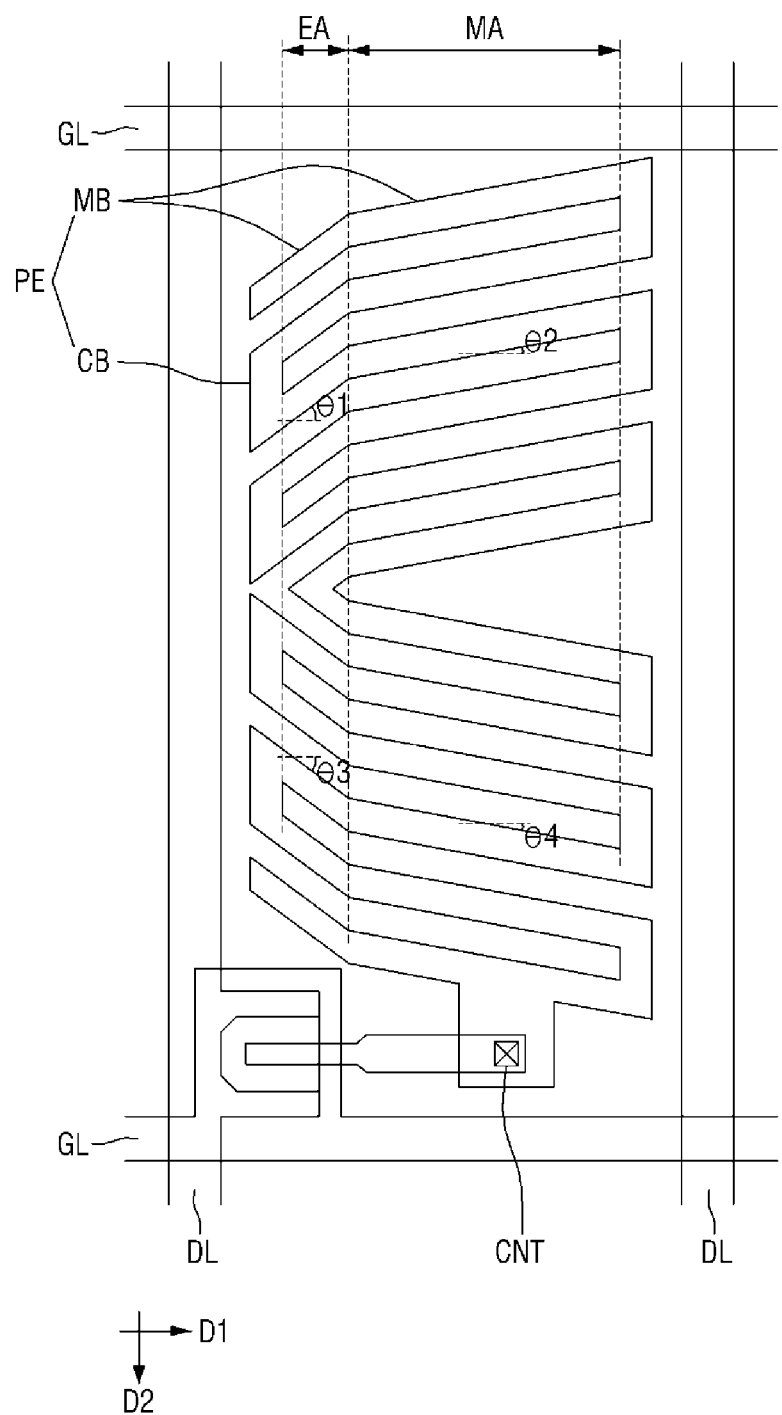
FIG. 6 is a plan view of a pixel of an LCD device according to another alternative exemplary embodiment of the disclosure.

FIG. 6 is a plan view of a pixel of an LCD device according to another alternative exemplary embodiment of the disclosure.

Referring to FIG. 6, in an exemplary embodiment, an edge area EA is disposed on a second side (e.g., the left side) of a main area MA in a first direction D1. In such an embodiment, the edge area EA of a pixel electrode PE, which is included in each pixel, may be provided on the first side or the second side of the main area in the first direction D1.

Figure 7:
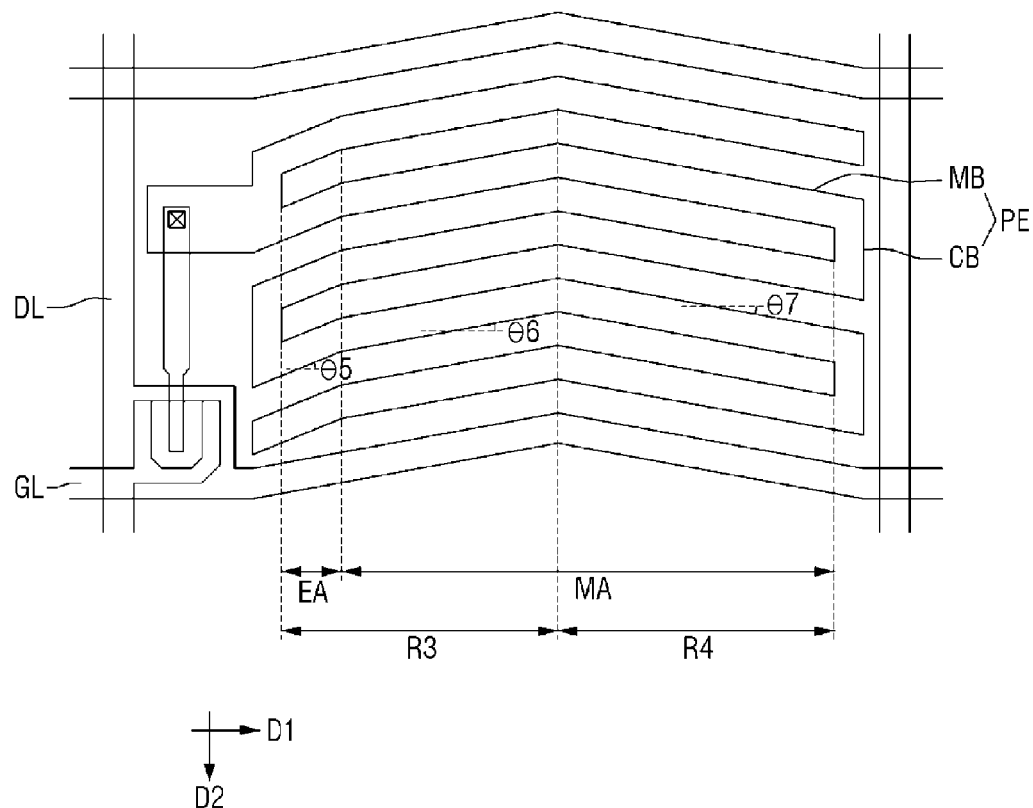
FIG. 7 is a plan view of a pixel of an LCD device according to another alternative exemplary embodiment of the disclosure.

FIG. 7 is a plan view of a pixel of an LCD device according to another alternative exemplary embodiment of the disclosure.

In an exemplary embodiment, as shown in FIGS. 1 and 3 through 6, the long axis of the pixel electrode PE extends along the second direction D2. Referring to FIG. 7, in an alternative exemplary embodiment, the long axis of a pixel electrode PE extends along a first direction D1.

In such an embodiment, even though the long axis of the pixel electrode PE extends in the first direction D1, each of a plurality of minute branches MB of the pixel electrode PE may extend substantially in the first direction, and a plurality of connecting branches CB may be disposed to connect the minute branches MB.

In such an embodiment, as described above, an area in which the minute branches MB are disposed may be divided into an edge area EA and a main area MA by an imaginary line extending in the second direction D2. The minute branches MB may form a fifth angle θ5 with the first direction D1 in the edge area EA, and may form a sixth angle θ6 with the first direction D1 in the main area MA.

In such an embodiment, the fifth angle θ5 may be larger than the sixth angle θ6, and the connecting branches CB may be disposed alternately on an outer side of the edge area EA and an outer side of the main area MA.

In an exemplary embodiment, where the pixel electrode PE includes a plurality of domain areas, the minute branches MB may also form a seventh angle θ7 with the first direction D1 in the main area MA. In such an embodiment, the seventh angle θ7 may be the same as the sixth angle θ6. However, in such an embodiment, each of the minute branches MB may be disposed across two domain areas. In such an embodiment, as shown in FIG. 7, each of the minute branches MB may be disposed across third and fourth domain areas R3 and R4, and the minute branches MB may be symmetrical in the main area MA with respect to a boundary between the third and fourth domain areas R3 and R4.

Figure 8:
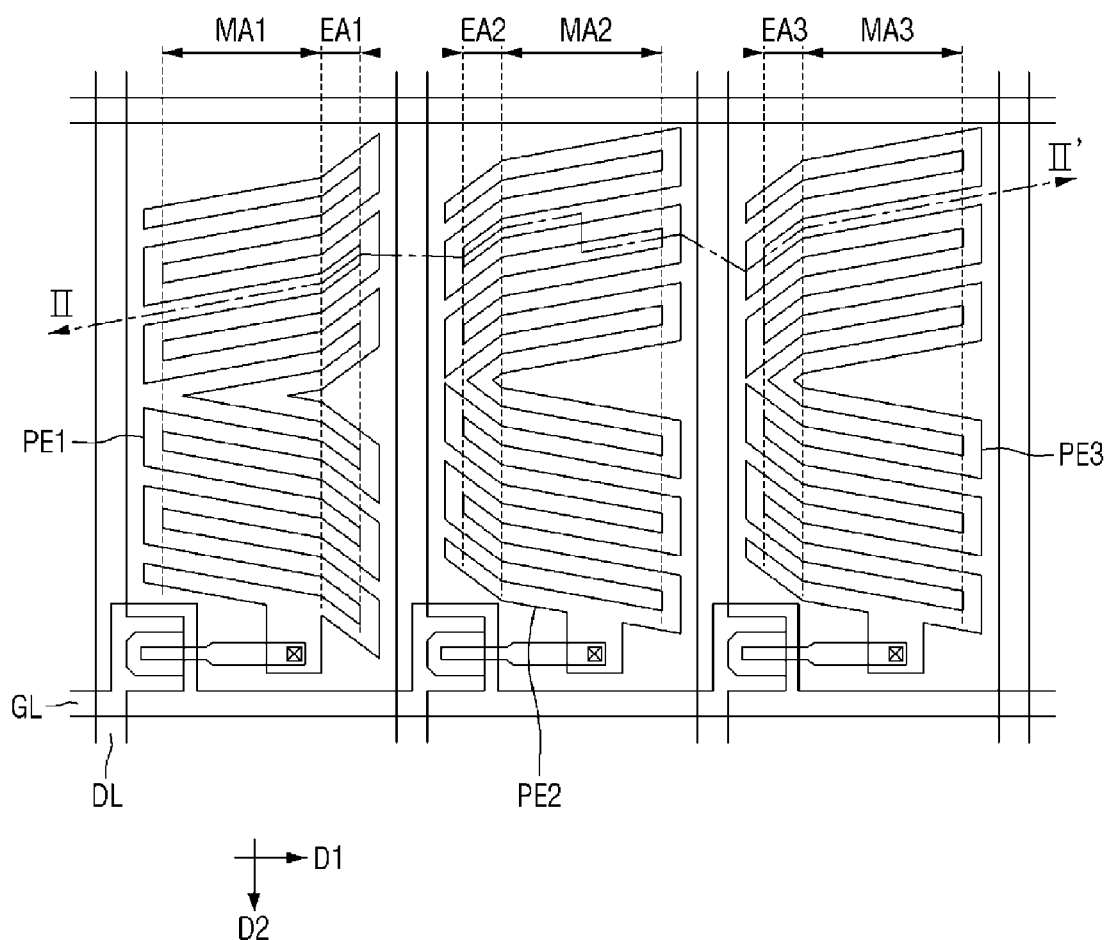
FIG. 8 is a plan view of some pixels of an LCD device according to another alternative exemplary embodiment of the disclosure.

FIG. 8 is a plan view of some pixels of an LCD device according to another alternative exemplary embodiment of the disclosure.

FIG. 8 illustrates three adjacent pixels that are sequentially arranged along a first direction D1, and the three pixels will hereinafter be referred to as first through third pixels PX1 through PX3.

Referring to FIG. 8, a red color filter RCF is disposed on a first pixel electrode PE1, which is the pixel electrode of the first pixel PX1, a green color filter GCF is disposed on a second pixel electrode PE2, which is the pixel electrode of the second pixel PX2, and a blue color filter BCF is disposed on a third pixel electrode PE3, which the pixel electrode of the third pixel PX3. Accordingly, light transmitted through liquid crystal molecules LC controlled by the first pixel electrode PE1 may pass through the red color filter RCF and may thus be viewed to the eyes of a user as red, light transmitted through liquid crystal molecules LC controlled by the second pixel electrode PE2 may pass through the green color filter GCF and may thus be viewed to the eyes of the user as green, and light transmitted through liquid crystal molecules LC controlled by the third pixel electrode PE3 may pass through the blue color filter BCF and may thus be viewed to the eyes of the user as blue.

An edge area EA of the first pixel electrode PE1 is disposed on a first side (e.g., the right side) of a main area MA of the first pixel electrode PE1, an edge area EA of the second pixel electrode PE2 is disposed on a second side (e.g., the left side) of a main area MA of the second pixel electrode PE2, and in the third pixel PX3, an edge area EA of the third pixel electrode PE3 is disposed on a second side (e.g., the left side) of a main area MA of the third pixel electrode PE3. In such an embodiment, the arrangement of a main area MA and an edge area EA, in and across which a plurality of minute branches MB are disposed, may slightly differ from the first pixel electrode PE1 to the second pixel electrode PE2 to the third pixel electrode PE3, and this is for minimizing the mixing of light between adjacent pixels and will hereinafter be described in detail with reference to FIG. 9.

Figure 9:
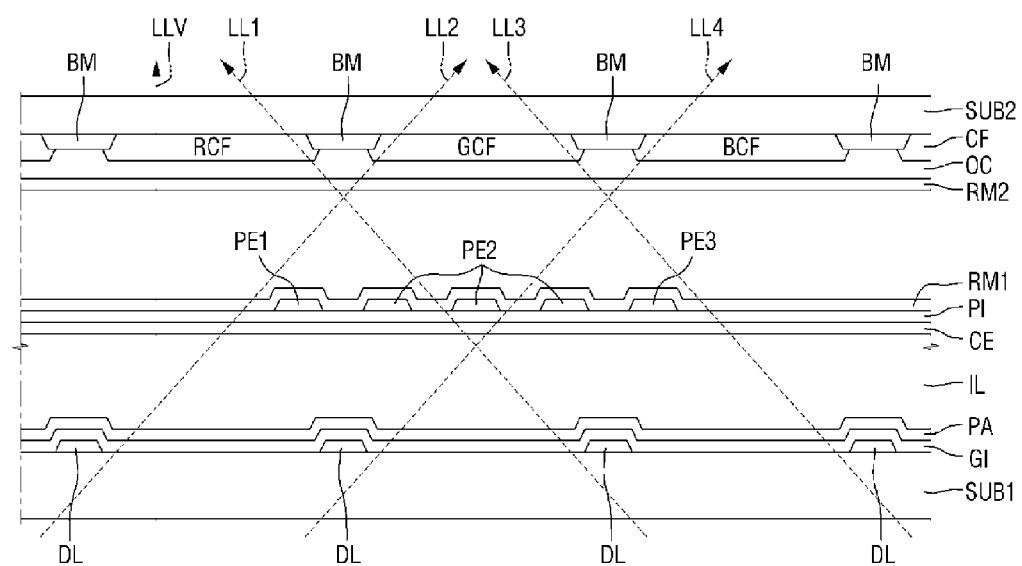
FIG. 9 is a cross-sectional view taken along line II-II' of FIG. 8.

FIG. 9 is a cross-sectional view taken along line II-II' of FIG. 8.

Referring to FIG. 9, light is incident from the bottom of the first base substrate SUB1. The incident light travels toward the second base substrate SUB2, which is disposed to face the first base substrate SUB1, components of the incident light traveling along, for example, a vertical optical path LLV, may pass through the red color filter RCF and may thus be viewed to the eyes of the user as red.

However, since the incident includes not only components traveling in a vertical direction with respect to the first base substrate SUB1, but also components traveling in other directions, the incident may include components of the incident light traveling along first through fourth optical paths LL1 through LL4. The components traveling along the first optical path LL1 pass through the liquid crystal molecules LC controlled by the second pixel electrode PE2, but may pass through the red color filter RCF disposed to overlap the first pixel electrode PE1, rather than the green color filter GCF disposed to overlap the second pixel electrode PE2. Thus, when the first pixel PX1 is turned off and the second pixel PX2 is turned on, only light passing through the green color filter GCF is supposed to be viewed to the eyes of the user. However, a color mixing phenomenon may occur in which light passing through the red color filter RCF may also be viewed, and may thus lower the display quality of an LCD device. The color mixing phenomenon may also be caused by the components traveling along the second through fourth optical paths LL2 through LL4.

In an exemplary embodiment, where the main area MA and the edge area EA of each of the first through third pixels PX1 through PX3 are arranged as shown in FIG. 8, the degradation of the display quality of an LCD device by color mixing may be minimized. In general, the transmittance of the color filter CF for white light may vary depending on the type of the color filter CF. That is, for the same white light, the green color filter GCF typically has a highest transmittance, and the red color filter RCF typically has a lower transmittance than the green color filter GCF, but a higher transmittance than the blue color filter BCF. Thus, even though light is incident along the first through fourth optical paths LL1 through LL4, the color mixing is most noticeable in light passing through the green color filter GCF along the second and third optical paths LL2 and LL3, is less noticeable in light passing through the red color filter RCF along the first optical path LL1, and is least noticeable in light passing through the blue color filter BCF along the fourth optical path LL4. Accordingly, in an exemplary embodiment, the edge EA of a pixel neighboring a pixel in which the green color filter GCF is disposed may be disposed adjacent to the pixel in which the green color filter GCF is disposed to reduce components of light traveling along the second and third optical paths LL2 and LL3, and thus, the color mixing may be substantially minimized.

In such an embodiment, an edge area EA may have a stronger control over the liquid crystal molecules LC, but a lower transmittance, than a main area MA. Accordingly, the edge areas EA of the first and third pixel electrodes PE1 and PE3, which are the pixel electrodes of the first and second pixels PX1 and PX3 neighboring the second pixel PX2, are disposed adjacent to the second pixel PX2, and the main areas MA of the first and third pixel electrodes PE1 and PE3 are disposed not adjacent to the second pixel PX2, and thus, a color mixing phenomenon that may be caused by the optical paths LL2 and LL3 may be minimized.

Color mixing caused by light passing through the blue color filter BCF along the fourth optical path LL4 is more noticeable than color mixing caused by light passing through the red color filter RCF along the first optical path LL1. Accordingly, in the second pixel PX2, in which the green color filter GCF is disposed, the edge area EA of the second pixel electrode PE2 is disposed adjacent to the first pixel PX1, in which the red color filter RCF is disposed, and the main area MA of the second pixel electrode PE2 is disposed adjacent to the third pixel PX3, in which the blue color filter BCF is disposed, and thus, the color mixing may be substantially minimized.

In an exemplary embodiment, as shown in FIGS. 8 and 9, pixels that display red, green and blue, respectively, are sequentially arranged in the order of red, green and blue, but the disclosure is not limited thereto. In an alternative exemplary embodiment, the arrangement of a main area MA and an edge area EA of a pixel electrode PE included in each pixel may be determined based on the color of a neighboring pixel. In one exemplary embodiment, for example, where pixels for displaying blue, red and green, respectively, are sequentially arranged, an edge area EA of the pixel that displays red may be disposed adjacent to the pixel that displays green, and a main area MA of the pixel that displays red may be disposed adjacent to the pixel that displays blue. In one alternative exemplary embodiment, for example, pixels that display green, blue and red are sequentially arranged, an edge area EA of the pixel that displays blue may be disposed adjacent to the pixel that displays green, and a main area MA of the pixel that displays blue may be disposed adjacent to the pixel that displays red.

Figure 10:
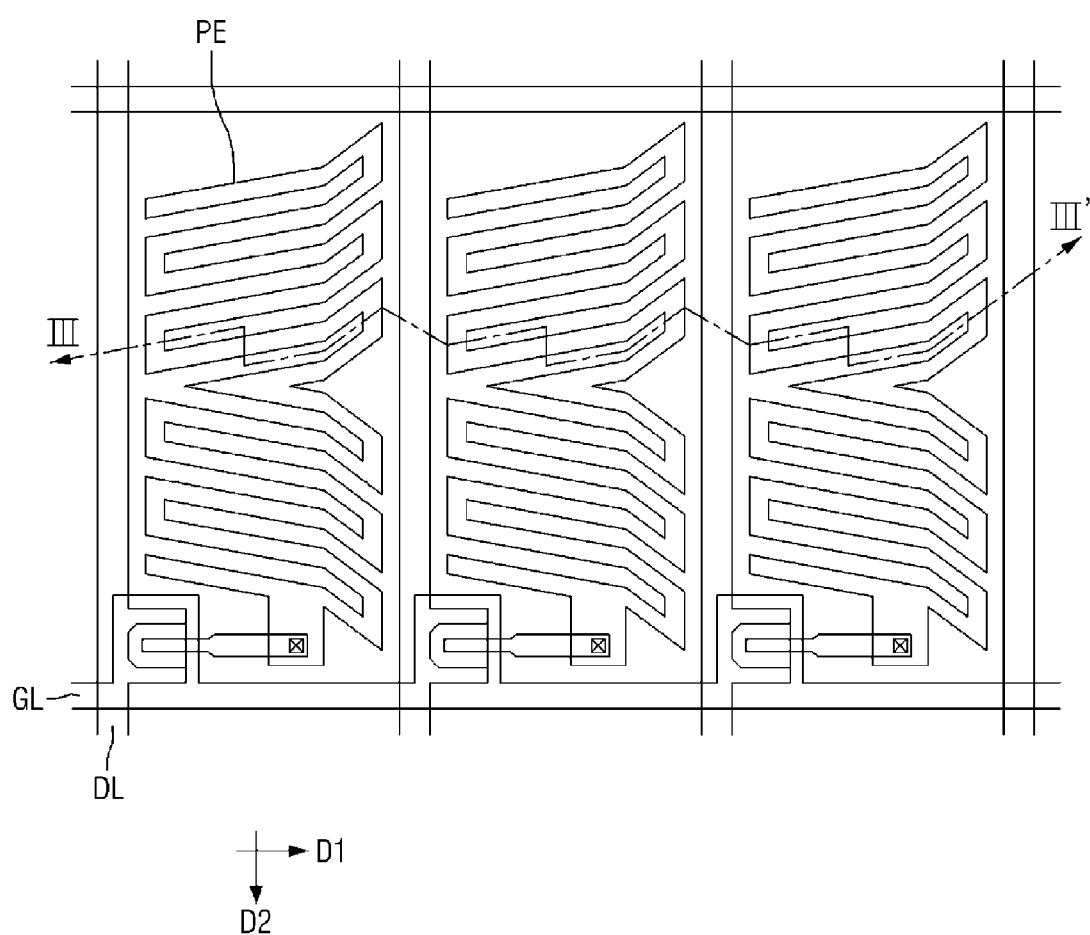
FIG. 10 is a plan view of some pixels of an LCD device according to another alternative exemplary embodiment of the disclosure.
Figure 11:
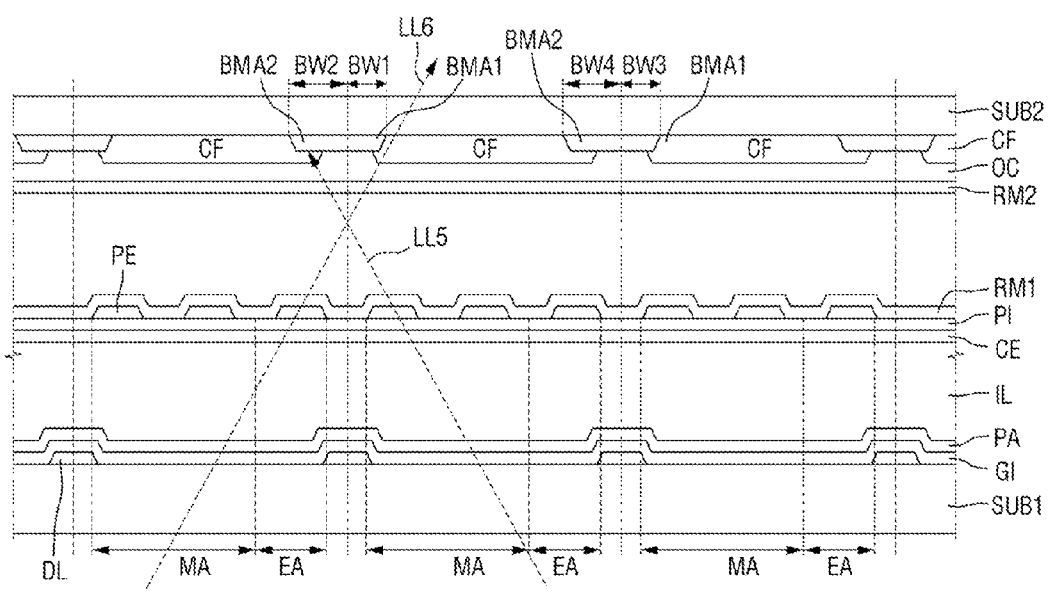
FIG. 11 is a cross-sectional view taken along line III-III' of FIG. 10.

FIG. 10 is a plan view of some pixels of an LCD device according to another exemplary embodiment of the disclosure, and FIG. 11 is a cross-sectional view taken along line III-III' of FIG. 10.

FIG. 10 illustrates three adjacent pixels that are sequentially arranged along a first direction D1.

Referring to FIGS. 10 and 11, in an exemplary embodiment, light-shielding members BM are disposed to overlap data line DLs, which extend in a second direction D2. In such an embodiment, the width of the light-shielding members BM in a first direction D1 in areas of overlap with the data lines DL is larger than the width of the data lines DL in the first direction D1.

In such an embodiment, the light-shielding members BM may be disposed to overlap not only the data lines DL, but also the TFTs of pixels and gate lines GL, as in the exemplary embodiments described above. In such an embodiment, as in the exemplary embodiments described above, the light-shielding members BM may effectively prevent light leakage that may be caused by the misalignment of liquid crystal molecules LC.

In an exemplary embodiment, each of the light-shielding members BM overlapping the data lines DL is divided into two parts by a line extending along a corresponding data line DL. In such an embodiment, each of the light-shielding members BM overlapping the data lines DL is divided, with respect to an imaginary line extending along a center of a corresponding data line DL, into a first light-shielding area BMA1 on a first side (e.g., the right side) of the imaginary line and a second light-shielding area BMA2 on a second side (e.g., the left side) of the imaginary line. In such an embodiment, the width of the first light-shielding area BMA1 in the first direction D1 may differ from the width of the second light-shielding area BMA2 in the first direction D1, and thus, the transmittance of an LCD device may be improved while minimizing color mixing.

In an exemplary embodiment, an edge area EA of the pixel electrode PE of a neighboring pixel on the second side of the first light-shielding area BMA1 in the first direction D1 is disposed closer than a main area MA of the corresponding pixel electrode PE to the first light-shielding area BMA1, and the first light-shielding area BMA1 has a first width BW1 in the first direction D1. In such an embodiment, the main area MA of the pixel electrode PE of the neighboring pixel is disposed closer than the edge area EA of the corresponding pixel electrode PE to the first light-shielding area BMA1, and the first light-shielding area BMA1 has a second width BW2 in the first direction D1. The first width BW1 may be smaller than the second width BW2.

In such an embodiment, where the first light-shielding area BMA1 has the first width BW1 or the second width BW2 depending on the pixel electrode arrangement of the neighboring pixel on the second side of the first light-shielding area BMA1 in the first direction D1, as described above, the transmittance of an LCD device may be improved while minimizing color mixing. In such an embodiment, as described above, an edge area EA may have a stronger control over the liquid crystal molecules LC, but a lower transmittance, than a main area MA. Thus, in such an embodiment, where the edge area EA of the pixel electrode PE of the neighboring pixel on the second side of the first light-shielding area BMA1 in the first direction D1 is disposed closer than the main area MA of the corresponding pixel electrode PE to the first light-shielding area BMA1, color mixing is less likely to occur because of a relatively low transmittance in the edge area EA, even if the width of the first light-shielding area BMA1 is reduced. In such an embodiment, where the first light-shielding area BMA1 may have a relatively small width, the transmittance increases.

In one exemplary embodiment, for example, light traveling along a fifth optical path LL5 passes through the main area MA of a pixel electrode PE and thus a color mixing phenomenon may occur due to the high intensity therein. Thus, in such an embodiment, the second light-shielding area BMA2 may have the second width BW2 in the first direction D1 to block the light traveling along the fifth optical path LL5. In such an embodiment, light traveling along a sixth optical path LL6 passes through the edge area EA of a pixel electrode PE and thus causes less color mixing. Thus, even if the first light-shielding area BMA1 for blocking the light traveling along the sixth optical path LL6 has the first width BW1, which is smaller than the second width BW2, color mixing may be effectively prevented.

In an exemplary embodiment, where an edge area EA of the pixel electrode PE of a neighboring pixel on the first side of the second light-shielding area BMA2 in the first direction D1 is disposed closer than a main area MA of the corresponding pixel electrode PE to the second light-shielding area BMA2, the second light-shielding area BMA2 has the first width BW1 in the first direction D1. In such an embodiment, where the main area MA of the pixel electrode PE of the neighboring pixel is disposed closer than the edge area EA of the corresponding pixel electrode PE to the second light-shielding area BMA2, the second light-shielding area BMA2 has the second width BW2 in the first direction D1. In such an embodiment, the first width BW1 may be smaller than the second width BW2.

Although some exemplary embodiments of the invention have been described for illustrative purposes, those skilled in the art will appreciate that various modifications, additions and substitutions are possible, without departing from the scope and spirit of the invention as disclosed in the accompanying claims.

What is claimed is:

1. A liquid crystal display device, comprising:
a first substrate;
a second substrate disposed opposite to the first substrate;
a liquid crystal layer interposed between the first and second substrates;
a first electrode disposed on the first substrate and having a planar shape; and
a second electrode disposed on the first substrate and comprising a plurality of pixel electrodes, which overlap the first electrode; wherein
each of the pixel electrodes comprises:
a plurality of minute branches disposed in parallel to one another; and
a plurality of connecting branches, which connect the minute branches,
the minute branches are disposed in a main area and a edge area in contact with the main area,
the connecting branches are disposed alternately in contact with an outer side of the edge area and in contact with a side of the main area, and
a first angle formed by the minute branches in the edge area with respect to a first direction is larger than a second angle formed by the minute branches in the main area with respect to the first direction, and
wherein
the minute branches formed at the first angle are disposed only in the edge area, and
the minute branches in the main area have a constant slope extending across the entire main area.

2. The liquid crystal display device of claim 1, wherein first and second ends of each of the connecting branches are respectively connected to a pair of adjacent minute branches.

3. The liquid crystal display device of claim 1, wherein a width of the edge area in the first direction is in a range of about 2 micrometers to about 5 micrometers.

4. The liquid crystal display device of claim 1, further comprising:
first through third color filters, which are disposed on the second substrate,
wherein the pixel electrodes comprises first through third pixel electrodes, which are three adjacent pixel electrodes sequentially arranged in the first direction, and the first through third color filters overlap the first through third pixel electrodes, respectively.

5. The liquid crystal display device of claim 4, wherein
an edge area of the first pixel electrode is disposed in contact with a first side of a main area of the first pixel electrode in the first direction, and
an edge area of each of the second and third pixel electrodes is disposed in contact with a second side, which is opposite to the first side, of a main area of the second and third pixel electrodes in the first direction.

6. The liquid crystal display device of claim 5, wherein
the first color filter is a red color filter,
the second color filter is a green color filter, and
the third color filter is a blue color filter.

7. The liquid crystal display device of claim 4, wherein
the first color filter is a red color filter,
the third color filter is a blue color filter, and
the edge area of the second pixel electrode is disposed in contact with the second side of the main area of the second pixel electrode in the first direction.

8. The liquid crystal display device of claim 4, wherein
the first color filter is a red color filter,
the third color filter is a green color filter, and
the edge area of the second pixel electrode is disposed in contact with the first side of the main area of the minute branches of the second pixel electrode in the first direction.

9. The liquid crystal display device of claim 4, wherein
the first color filter is a green color filter,
the third color filter is a blue color filter, and
the edge area of the second pixel electrode is disposed in contact with the second side of the main area of the second pixel electrode in the first direction.

10. The liquid crystal display device of claim 1, further comprising:
a plurality of data lines disposed on the first substrate along a second direction, which crosses the first direction; and
light-shielding members disposed on the second substrate and overlapping the data lines, respectively,
wherein a width of the light-shielding members in the first direction is larger than a width of the data lines in the first direction.

11. The liquid crystal display device of claim 10, wherein
each of the light-shielding members are divided into a first light-shielding area to defined on a first side, in the first direction, with respect to an imaginary line extending along a center of a corresponding data line, and a second light-shielding area defined on a second side with respect to the imaginary line in the first direction, and
a width of the first light-shielding area in the first direction differs from a width of the second light-shielding area in the first direction.

12. The liquid crystal display device of claim 10, wherein
each of the light-shielding members are divided into a first light-shielding area defined on a first side in the first direction with respect to an imaginary line extending along a center of a corresponding data line in the second direction, and a second light-shielding area defined on a second side in the first direction with respect to the imaginary line,
the first light-shielding area has a first width in the first direction when an edge area of a neighboring pixel electrode on the second side of the first light-shielding area in the first direction is disposed closer than a main area of the neighboring pixel electrode to the first light-shielding area, the first light-shielding area has a second width in the first direction when the main edge area of a neighboring pixel electrode on the second side of the first light-shielding area in the first direction is disposed closer than the edge area of the neighboring pixel electrode to the first light-shielding area, and the first width is smaller than the second width.

13. A liquid crystal display device, comprising:

a first substrate;

a second substrate disposed opposite to the first substrate;

a liquid crystal layer interposed between the first and second substrates;

a first electrode disposed on the first substrate and having a planar shape; and a second electrode disposed on the first substrate and comprising a plurality of pixel electrodes, which overlap the first electrode;

wherein each of the pixel electrodes is divided into first and second domain areas, which are symmetrical with respect to an imaginary line extending in a first direction, each of the pixel electrodes comprises:

a plurality of first minute branches, which are in the first domain and disposed in parallel to one another, a plurality of first connecting branches, which are in the first domain and connect the first minute branches;

a plurality of second minute branches, which are in the second domain and disposed in parallel to one another; and a plurality of second connecting branches, which are in the second domain and connect the second minute branches, the first minute branches and the second minute branches are disposed in a main area and a edge area in contact with the main area, the first connecting branches are disposed alternately in contact with an outer side of the edge area of the first domain area and an outer side of the main area of the first domain area, the second connecting branches are disposed alternately in contact with an outer side of the edge area of the second domain area and an outer side of the main area of the second domain area, a first angle formed by the first minute branches in the edge area of the first domain area with respect to the first direction is larger than a second angle formed by the first minute branches in the main area of the first domain area with respect to the first direction, a third angle formed by the second minute branches in the edge area of the second domain with respect to the first direction is symmetrical with the first angle with respect to the first direction, and a fourth angle formed by the second minute branches in the main area of the second domain with respect to the first direction is symmetrical with the second angle with respect to the first direction.

14. The liquid crystal display device of claim 13, wherein each of the first connecting branches are connected to adjacent first minute branches, and each of the second connecting branches is connected to adjacent second minute branches.

15. The liquid crystal display device of claim 13, wherein a width of the edge area of the first or second domain area in the first direction is in a range of about 2 micrometers to about 5 micrometers.

16. The liquid crystal display device of claim 13, further comprising:

first through third color filters, which are disposed on the second substrate, wherein the pixel electrodes comprises first through third pixel electrodes, which are three adjacent pixel electrodes sequentially arranged in the first direction, and the first through third color filters overlap the first through third pixel electrodes, respectively.

17. The liquid crystal display device of claim 16, wherein an edge area of the first pixel electrode is disposed in contact with a first side of a main area of the first pixel electrode in the first direction, and an edge area of each of the second and third pixel electrodes is disposed in contact with a second side of a main area of the second and third pixel electrodes in the first direction.

18. The liquid crystal display device of claim 17, wherein the first color filter is a red color filter, the second color filter is a green color filter, and the third color filter is a blue color filter.

19. The liquid crystal display device of claim 13, further comprising:

a plurality of data lines disposed on the first substrate along a second direction, which crosses the first direction; and light-shielding members disposed on the second substrate and respectively overlapping the data lines, wherein a width of the light-shielding members in the first direction is larger than a width of the data lines in the first direction.

20. The liquid crystal display device of claim 19, wherein each of the light-shielding members is divided into a first light-shielding area, which is disposed on a first side, in the first direction, with respect to an imaginary line extending along a center of a corresponding data line, and a second light-shielding area, which is disposed on a second side with respect to the imaginary line in the first direction, the first light-shielding area has a first width in the first direction when an edge area of a neighboring pixel electrode on the second side of the first light-shielding area in the first direction is disposed closer than a main area of the neighboring pixel electrode to the first light-shielding area, the first light-shielding area has a second width in the first direction when the main edge area of a neighboring pixel electrode on the second side of the first light-shielding area in the first direction is disposed closer than the edge area of the neighboring pixel electrode to the first light-shielding area, and the first width is smaller than the second width.

* * * * *